United States Patent [19]

Shimizu et al.

[11] Patent Number: 4,896,110

[45] Date of Patent: Jan. 23, 1990

[54] DIFFERENTIAL TRANSFORMER FOR DETECTING THE DISPLACEMENT OF A PROBE USING THE COMBINED OUTPUT OF TWO MODES OF OPERATION

[75] Inventors: Giichiro Shimizu; Toshiharu Okuyama; Yoshio Wakatsuki, all of Tokyo, Japan

[73] Assignee: Man Design Co., Ltd., Tokyo, Japan

[21] Appl. No.: 223,930

[22] Filed: Jul. 25, 1988

[30] Foreign Application Priority Data

Aug. 5, 1987 [JP] Japan ............................ 62-120099[U]

[51] Int. Cl.$^4$ ...................... G01B 7/14; G08C 19/06; G08C 19/12
[52] U.S. Cl. .............................. 324/208; 340/870.31; 33/558
[58] Field of Search ............................ 324/207, 208; 340/870.31–870.36; 318/656, 657, 658, 659, 660, 661; 33/558, 561

[56] References Cited

U.S. PATENT DOCUMENTS 4,651,130  3/1987  Pennell ................................ 318/656

FOREIGN PATENT DOCUMENTS 3602107  7/1987  Fed. Rep. of Germany .

Primary Examiner—Reinhard J. Eisenzopf
Assistant Examiner—Walter E. Snow
Attorney, Agent, or Firm—Nixon & Vanderhye

[57] ABSTRACT

In a length measuring apparatus, a measurement probe includes a core and is movable in an axial direction of the probe. First to third coils are arranged in an order in a moving area of the core in accordance with the movement of the probe. In the B-phase, the first and second coils are primary and the second and third coils are secondary. In the A-phase, the second and third coils are primary and the first and second coils are secondary. CPU first sets a switch in the B-phase and then in the A-phase. A moving amount of the core is calculated from secondary voltage data in both the B-phase and the A-phase.

10 Claims, 4 Drawing Sheets

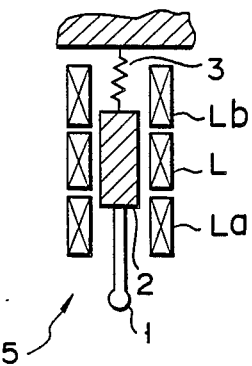
F I G. 3
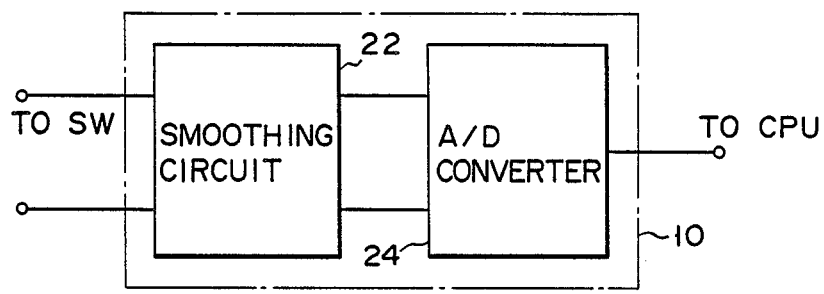
F I G. 4
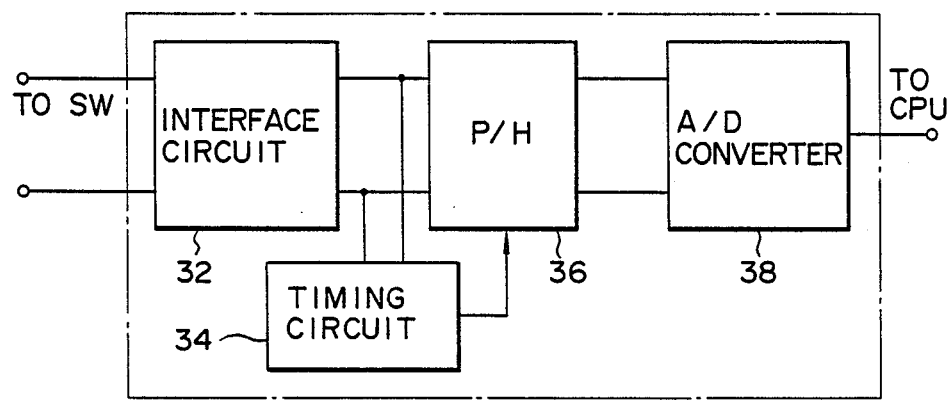
F I G. 5

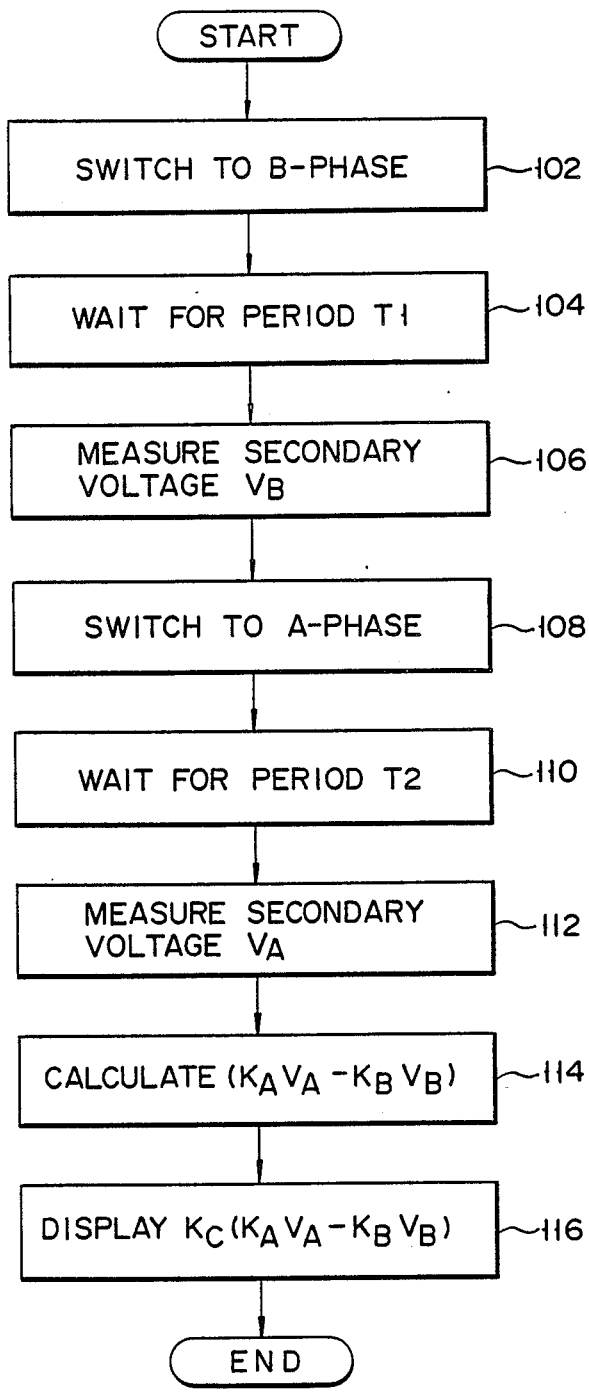
F I G. 8

DIFFERENTIAL TRANSFORMER FOR DETECTING THE DISPLACEMENT OF A PROBE USING THE COMBINED OUTPUT OF TWO MODES OF OPERATION

BACKGROUND OF THE INVENTION

1. Field of the Invention

The present invention relates to a method of measuring a length and an apparatus therefor, wherein power consumption can be reduced and a secondary output can be multiplied.

2. Description of the Related Art

A dial gauge as one of precision gauges is a typical length measuring apparatus widely used in a machine industrial field. A main body is fixed to a predetermined position with respect to a reference position or a reference surface. A probe extended from the main body is reciprocatedly held and is brought into contact with the reference surface or a surface of an object to be measured. As a result, a position of the probe is displaced and retracted. A retracting amount is transmitted to an indicator of the main body to cause an indicating needle to swing, so that a length can be measured on the order of 1/1,000 mm. In addition, the above apparatus is utilized in measurement of the diameter and circularity of the object to be measured.

In the measuring apparatus as described above, digital apparatuses are recently available. In this apparatus, a rod-like core having a predetermined size is bonded in tandem with the probe so as to coincide their axial directions. An end portion of the core is compressed by a compression spring so that the probe is outwardly biased. The probe including the core is supported so as to be movable in the axial direction. Coils La, L, and Lb are arranged in a moving area of the core in accordance with the displacement of the probe brought into contact with the object to be measured. Coil L is arranged in the center of these coils. Coils La and Lb are respectively arranged at both ends of coil L. The core can be freely moved through coils La, L, and Lb. FIG. 1 shows an equivalent circuit arrangement of this apparatus. Coil L serves as a primary coil, and coils La and Lb each having the identical standards serve as secondary coils. Inversely series-connected secondary coils La and Lb constitute a differential coil arrangement.

An RF current having a high frequency of about 10 kHz is supplied to primary coil L, and outputs from secondary coils La and Lb are obtained as outputs corresponding to a position of the core. Since secondary coils La and Lb are differentially wound, a voltage difference therebetween can be obtained.

Since the core influences inductances of the secondary coils, the voltage difference between secondary coils La and Lb reflects a position of the core. Therefore, secondary output voltage Vout is detected, so that a moving amount of the probe can be measured.

The conventional length measuring apparatus as described above has an arrangement wherein an output difference is obtained as a measuring amount. In addition, since induction voltages of secondary coils La and Lb are about 1 V each, the obtained voltage difference is small. Therefore, an amplifier is necessary. In order to assure high measuring precision, the amplifier having good temperature characteristics is required. However, the amplifier having the good temperature characteristics is expensive, thus increasing cost of the apparatus.

In the length measuring apparatus of this type, a built-in battery is employed as a power supply so that the apparatus can be readily used anywhere as a handy-type apparatus. For this reason, a high impedance of the coil is required. Since the impedance of the coil is in proportion to the number of turns of the coil, the coil must have a large size in order to obtain a high impedance and to reduce power consumption, thereby causing an increase in size of the apparatus.

SUMMARY OF THE INVENTION

It is an object of the present invention to provide a method of measuring a length and an apparatus therefor, wherein a compact, energy-saving, and inexpensive arrangement can be realized and high-precision measurement can be achieved at low cost.

In order to achieve the above object, the present invention has the following arrangement. More specifically, a length measuring apparatus of the present invention comprises a measurement probe, including a core arranged at a base thereof, biased in one direction and movable in an axial direction, first to third coils arranged in an order in a moving area of the core in accordance with the movement of the probe, a central coil of the coils being connected in series with one terminal of a corresponding one of the coils arranged at both ends of the central coil so as to allow a forward biased state, a switch connected to the other terminal of a corresponding one of the coils arranged at both ends of the central coil, the switch being switched to cause one of the coils arranged at the both ends of the central coil to define a primary coil with the central coil, and to cause the other of the coils to define the secondary coil with the central coil, calculating and controlling means for measuring a voltage inducted by the secondary coil in accordance excitation of the primary coil in response to switching of the switch and calculating a difference of output voltages between the both secondary coils, thereby obtaining a moving amount, and a displaying means for displaying the obtained measuring amount.

With this arrangement, the core is arranged at the probe brought into contact with an object to be measured, and the coils of the transformer having the core described above are arranged in the moving area of the core to obtain the secondary output voltage corresponding to the position of the core. In addition, parts of the primary and secondary coils of the transformer are commonly used to increase the numbers of turns of the primary and secondary coils. Therefore, a high impedance and a high-output voltage can be obtained and an amplifier need not be used. The secondary coil is switched to obtain the voltage difference, so that an influence of the temperature characteristics of the coil can be canceled to obtain the secondary output voltage corresponding to the moving position of the core, thereby calculating the moving amount of the core, and digitally displaying the calculation result.

According to the present invention as described above, there is provided a compact, energy-saving, and inexpensive length measuring apparatus which can achieve high-precision measurement.

BRIEF DESCRIPTION OF THE DRAWINGS

FIG. 3 is a schematical view showing an arrangement of a measuring unit of a length measuring apparatus;

FIG. 4 is a block diagram showing a detailed arrangement of a data conversion unit according to the embodiment shown in FIG. 2;

FIG. 5 is a block diagram showing an arrangement of the data conversion unit, according to another embodiment;

FIG. 8 is a flow chart for explaining an operation.

DETAILED DESCRIPTION OF THE PREFERRED EMBODIMENTS

Embodiments of the present invention will be described below with reference to the accompanying drawings.

Figure 1:
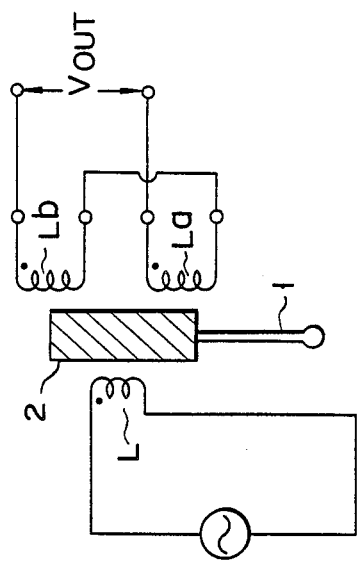
FIG. 1 is a circuit diagram showing an arrangement of a main part of a conventional circuit.
Figure 2:
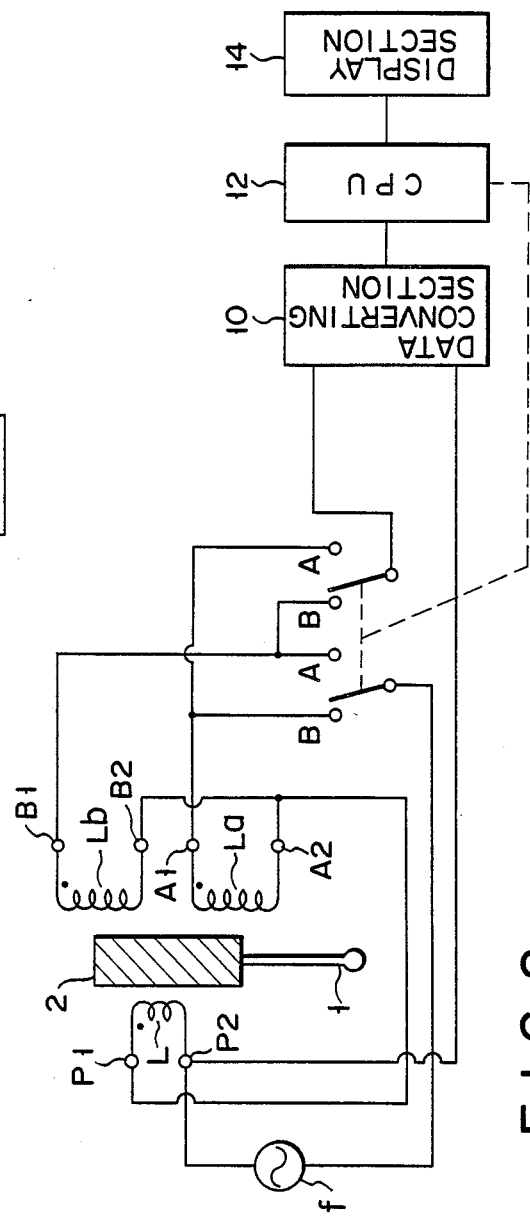
FIG. 2 is a circuit diagram for explaining an embodiment of the present invention.

FIG. 2 is a circuit diagram showing an embodiment of the present invention.

As shown in FIG. 3, voltage transformer 5 is arranged as follows. Rod-like core 2 having a predetermined size is bonded in tandem with probe 1 so that they coincide along their axial directions thereof. An end portion of core 2 is biased by spring 3 so that probe 1 is outwardly biased. Probe 1 including core 2 is movably supported in the axial direction of core 2. Coils La, L, and Lb are arranged in the moving area of core 2 in accordance with the movement amount of probe 1 which is brought into contact with an object to be measured. Core 2 can be moved through coils La, L, and Lb. Of coils La, L, and Lb, central coil L serves as a common coil and coils La and Lb are connected in series with common coil L. In addition, one of the coils La and Lb is connected in series with common coil L to serve as a primary coil, and the other of the coils La and Lb is connected in series with common coil L to serve as a secondary coil in response to switching of analog switch SW for switching circuits. When the coils La and Lb are each connected with common coil L to constitute the primary and secondary coils, they are forward-biased in series with common coil L.

More specifically, terminal P1 of common coil L is connected to terminal A2 of coil La and terminal B2 of coil Lb, terminal A1 of coil La is connected to an A-phase switching terminal side of analog switch SW, terminal B1 of coil Lb is connected to a B-phase switching terminal side of analog switch SW, and output side terminal of oscillator f is connected between the common side terminal of analog switch SW and terminal P2 of common coil L. Analog switch SW is switched by control and arithmetic operation CPU 12. A ratio of the number of turns of the common coil L to that of coil La or Lb is, e.g., substantially 180:100, and an output of oscillator f has a frequency of about 500 kHz and a voltage of about 3 V. Data conversion unit 10 converts output voltages of the coils into digital data. CPU 12 calculates a moving amount of core 2 in accordance with the digital data. The result calculated by CPU 12 is displayed on digital display 14. FIG. 4 shows an arrangement of data conversion unit 10. Referring to FIG. 4, a secondary voltage input through switch SW is smoothed by smoothing circuit 22. The smoothed voltage is then converted into the digital data by A/D converter 24 and supplied to CPU 12.

FIG. 5 shows another embodiment of data conversion unit 10. In this embodiment, a secondary voltage of voltage transformer 5 is supplied to interface circuit 32. Timing circuit 34 generates a timing signal for representing a peak of the secondary voltage in response to the output from circuit 32. Peak hold circuit 36 holds an output from the interface circuit, i.e., a peak value of the secondary voltage in response to the timing signal. The A/D converter converts the peak value into a digital data and outputs the data to CPU 12.

An operation of this apparatus having the above arrangement will be described below with reference to FIG. 8.

In this apparatus, inductance components of coils La, L, and Lb constituting a transformer are changed in accordance with a relative position of core 2 and a secondary output voltage is changed, thereby obtaining a retracting amount of probe 1 in accordance with the secondary output voltage when the probe was brought into contact with the object to be measured.

Figure 6A:
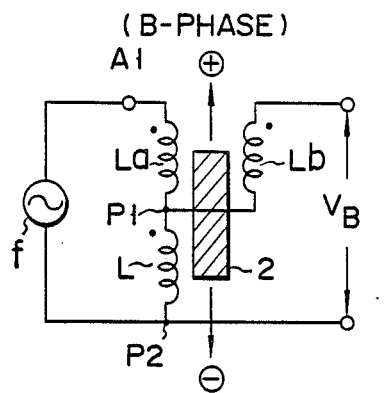
FIGS. 6A and 6B are circuit diagrams for explaining states of a circuit arrangement in response to switching.

More specifically, in this apparatus, analog switch SW is switched to the B-phase under the control of CPU 12, in step 102. Then, a circuit connection state as shown in FIG. 6A is set, coils La and Lb respectively constituting the primary and secondary coils with common coil L. Symbols "+" and "−" represent a positional relationship between coil Lb and core 2. The number of turns of the primary coil including common coil L is 280, and that of the secondary coil including common coil L is also 280. Since an output having a frequency of 500 kHz and a voltage of 3 V from oscillator f is applied to excite the primary coil, the secondary output voltage is, e.g., a voltage on the order of several positive volts in accordance with a relative position of core 2 with respect to position of coils La, L, and Lb. After switching, in step 104, CPU 12 waits for a lapse of time period T1, i.e., about 20 ms until a stable output from the transformer circuit is obtained. In step 106, output voltage VB is converted into the digital data by data conversion unit 10 and stored in CPU 12.

Figure 6B:
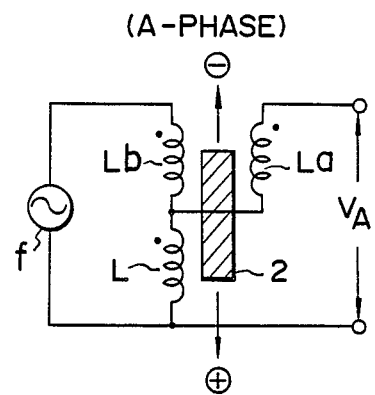

After measuring in the B-phase, in step 108, CPU 12 switches analog switch SW to the A-phase. Then, a circuit connection state as shown in FIG. 6B is allowed, and coils Lb and La respectively constitute the primary and secondary coils with common coil L. Symbols "+" and "−" represent a positional relationship between coil La and core 2. The number of turns of the primary coil including common coil L is 280, and that of the secondary coil including common coil L is also 280. Since an output having a frequency of 500 kHz and a voltage of 3 V from oscillator f is applied to excite the primary coil, the secondary output voltage is, e.g., a voltage on the order of several positive volts in accordance with a relative position of core 2 with respect to positions of coils La, L, and Lb. In step 110, CPU 12 waits for a lapse of time period T2 in the same manner as in switching to the B-phase. In step 112, output voltage VA is converted into digital data by data conversion unit 10 and stored in CPU 12. In step 114, CPU 12 calculates a difference between the two measured voltages. In step 116, a position of core 2 is calculated in accordance with the result and the moving amount is digitally displayed on digital display 14. In step 116, in order to convert a voltage difference (KAVA−KBVB) into the moving amount, the difference is multiplied with coefficient KC. KA and KB are associated with the numbers of turns of coils La and Lb (to be described later).

Figure 7A:
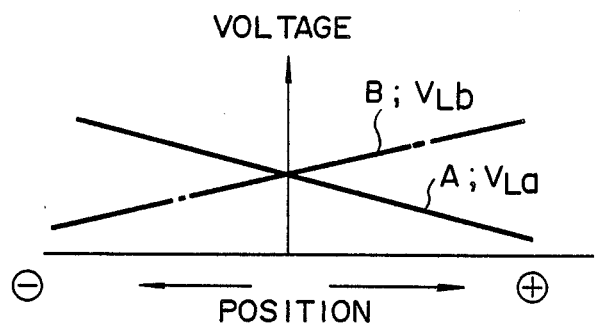
FIGS. 7A and 7B are views for explaining characteristics of a secondary voltage measurement value according to the present invention.
Figure 7B:
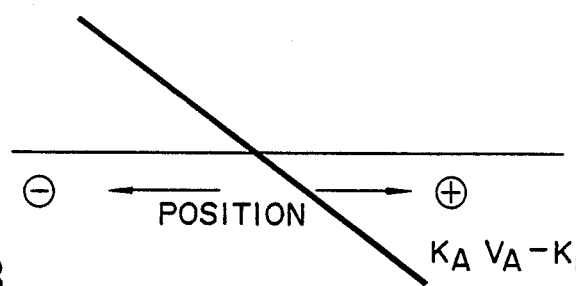

Output voltage VLb of coil Lb in the circuit connection state in the B-phase on the basis of the positional relationship between core 2 and the coils, as shown in FIG. 6A, is represented by "B" in FIG. 7A. Output voltage VLa of coil La in the A-phase, as shown in FIG. 6B, is represented by "A" in FIG. 7A. A position of core 2 can be estimated in accordance with one of the output voltages (VA=VLb+VL or VB=VLa+VL). In the B-phase, since three coils are arranged as shown in FIG. 3, voltage VLb of coil Lb is substantially determined in accordance with a transinductance of coils L and Lb. The inductance of coil Lb is increased as the coil is moved in the "+" direction, so that voltage VLb shown in FIG. 7A can be obtained. This also applies to voltage VLa of coil La in the A-phase. However, voltages VLa, VLb, and VL are influenced by temperature characteristics of the coils. In order to cancel the temperature characteristics of the coils, a difference of both outputs VA and VB in the A- and B-phases is calculated. The output characteristics of the difference are shown in FIG. 7B. In FIGS. 6A and 6B, assume that the upper and lower regions with respect to the intermediate point in the moving area of core 2 are defined as the positive (+) and negative (−) regions, respectively. When core 2 is in the negative region, a positive voltage corresponding to the central point described above (defined as "0") is obtained. When core 2 is in the positive region, a negative voltage corresponding to the central point (defined as "0") is also obtained. In this embodiment, a ratio of the number of turns of coil La to that of coil L is 180:100. This ratio is equal to a ratio of coils Lb to L, i.e., the numbers of turns of coils La and Lb are substantially equal to each other. However, when the ratio of the number of turns of coil La to that of coil Lb is Kc, coefficient Kc is calculated as follows:

$$KA/KB = Kc$$

The voltage described above is on the order of V as compared with that the voltage in the prior art is on the order of mV. Thus, according to the present invention, the high output voltage can be obtained, the temperature characteristics are canceled, and the amplifier is not necessary. Therefore, high-precision measurement can be achieved at low cost.

When common coil L is commonly used in the primary and secondary coils, and coil La or Lb is used as the secondary coil, the remaining one of them can be used as the primary coil. Therefore, the numbers of turns of coils can be increased without increasing the number of coils, thereby realizing a high-impedance arrangement and low power consumption. In addition, even if the numbers of coils and the turns of coils are identical as those in the conventional case, the lower power consumption can be achieved in the present invention than that in the conventional case. For this reason, a compact length measuring apparatus can be realized.

Note that the present invention is not limited to the embodiments as described above and shown in the accompanying drawings, and various changes and modifications may be made within the spirit and scope of the invention.

What is claimed is:

1. A length measuring apparatus comprising: current supplying means for supplying an AC current; voltage transformer means including first, second and third coils, a core and a probe, said first coil having first and second terminals, said second coil having third and fourth terminals, said third coil having fifth and sixth terminals, said first, second and third coils being arranged in a predetermined order, said third terminal being connected to said second and sixth terminals, and said probe being arranged at a distal end of said core on a first coil side thereof and being brought into contact with an object to be measured, thereby causing said core to move from said first coil toward said third coil;

data converting means connected to said voltage transformer means for converting a secondary voltage output from said voltage transformer means into digital data;

display means for displaying input moving amount data;

switching means, connected to said voltage transformer means to said current supplying means, for connecting said current supplying means between said first terminal of said first coil and said fourth terminal of said second coil to apply said secondary voltage output appearing between said third terminal of said second coil and said fifth terminal of said third coil to said data converting means in a first mode, and for connecting said current supplying means between said fifth terminal of said third coil and said fourth terminal of said second coil to apply said secondary voltage appearing between said fourth terminal of said second coil and said fifth terminal of said third coil to said data converting means in a second mode; and control means, connected to said switching means, for setting said switching means in the first mode, for receiving the digital data output from said data converting means as first mode data in the first mode, for setting said switching means in the second mode, for setting said switching means in the second mode, for receiving the digital data output from said data converting means as second mode data in the second mode, and for calculating the moving amount data from the first and second mode data to output the calculated moving amount data to said display means.

2. An apparatus according to claim 1, wherein a length of said core is shorter than a total width of said first to third coils.

3. An apparatus according to claim 1, wherein said control means includes calculating means for calculating a value (K1V1−K2V2), and for calculating the moving amount data in accordance with the value (K1V1−K2V2), where V1 and V2 are the first and second mode data, and K1 and K2 are predetermined constants.

4. An apparatus according to claim 3, wherein a ratio of the number of turns of said first coil to that of said third coil is substantially equal to a ratio of K1 to K2.

5. An apparatus according to claim 3, wherein the number of turns of said first coil is substantially equal to that of said third coil, and K1 and K2 are each equal to 1.

6. An apparatus according to claim 1, wherein said data converting means comprises:

smoothing means for smoothing said secondary voltage from said voltage transformer means; and A/D converting means for converting the smoothed voltage from said smoothing means into the digital data.

7. An apparatus according to claim 1, wherein said data converting means comprises:

peak holding means for holding a peak value of the secondary voltage output from said voltage transformer means in accordance with an input timing signal;

timing signal generating means for generating the timing signal in accordance with the secondary voltage output from said voltage transformer means and for outputting the generated signal to said peak holding means; and A/D converting means for converting the peak value held in said peak holding means into the digital data.

8. A method of measuring a length, comprising:

moving a core from first toward third coils during a length measurement, said first to third coils and said core constituting a voltage transformer, said first to third coils being arranged in a fixed order, one terminal of said second coil being connected in series with a first terminal of each of a corresponding one of said first and third coils;

in a first mode, connecting an AC current source between another terminal of said first coil and another terminal of said second coil and obtaining first mode data from a secondary voltage appearing between said another terminal of said second coil and said another terminal of said third coil;

in a second mode, connecting said current source between said another terminal of said third coil and said another terminal of said second coil and obtaining second mode data from the secondary voltage appearing between said another terminal of said second coil and said another terminal of said third coil; and calculating moving amount data from the first and second mode data and displaying the calculated moving amount data.

9. A method according to claim 8, wherein said calculating the moving amount data includes calculating a value ($K_1V_1 - K_2V_2$) and for calculating the moving amount data in accordance with the value, where $V_1$ and $V_2$ are the first and second mode data, and $K_1$ and $K_2$ are predetermined constants.

10. A method according to claim 9, wherein the number of turns of said first coil is substantially equal to that of said third coil, and $K_1$ and $K_2$ are each equal to 1.

* * * * *